United States Patent
Suzuki et al.

(10) Patent No.: US 7,212,897 B2
(45) Date of Patent: May 1, 2007

(54) VEHICLE DOOR CONTROLLING APPARATUS

(75) Inventors: Shintaro Suzuki, Kasugai (JP);
Tomoaki Imaizumi, Aichi-ken (JP);
Eiji Itami, Chiryu (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 267 days.

(21) Appl. No.: 10/828,182

(22) Filed: Apr. 21, 2004

(65) Prior Publication Data

US 2004/0267425 A1 Dec. 30, 2004

(30) Foreign Application Priority Data

Apr. 21, 2003 (JP) ............................. 2003-115996

(51) Int. Cl.
*G06F 19/00* (2006.01)
(52) U.S. Cl. .................... 701/49; 318/282; 318/466
(58) Field of Classification Search .................... 701/1, 701/36, 49; 318/280–282, 466, 468; 49/138, 49/139, 360

See application file for complete search history.

(56) References Cited

U.S. PATENT DOCUMENTS

| | | | | |
|---|---|---|---|---|
| 4,713,591 A | * | 12/1987 | McCloskey | .................. 318/257 |
| 5,350,986 A | * | 9/1994 | Long et al. | .................. 318/432 |
| 5,396,158 A | * | 3/1995 | Long et al. | .................. 318/282 |
| 6,178,699 B1 | * | 1/2001 | Kawanobe et al. | ............ 49/360 |
| 6,208,102 B1 | | 3/2001 | Kikuchi et al. | |
| 6,525,499 B2 | * | 2/2003 | Naganuma | ................... 318/445 |
| 6,580,243 B2 | * | 6/2003 | Itami et al. | .................. 318/452 |
| 2005/0179409 A1 | * | 8/2005 | Honma et al. | ................. 318/62 |

FOREIGN PATENT DOCUMENTS

| | | |
|---|---|---|
| JP | 10(1998)-169313 | 6/1998 |
| JP | 2003 120125 | 4/2003 |

OTHER PUBLICATIONS

European Search Report dated Nov. 9, 2005.

* cited by examiner

*Primary Examiner*—Gary Chin
(74) *Attorney, Agent, or Firm*—Buchanan Ingersoll & Rooney PC

(57) ABSTRACT

In order to provide a vehicle door controlling apparatus, which even when the vehicle starts to move while doors of the vehicle are in closed operation, performs insertion detection accurately without reducing the sensitivity of insertion detection. In the present invention, speed adjustment is performed by an applied voltage and a vehicle door is driven by a motor by voltage driving. The speed during the movement of the vehicle door is detected by Hall elements, and the door speed during the movement of the vehicle door is obtained from the detected signal. A controller having an insertion detection function controls the door speed to be the predetermined target door speed. In this case, the controller detects stoppage or driving of the vehicle, and when the state of the vehicle is in the driving state while the vehicle door is in closing operation, the voltage applied to the motor is increased compared to the stop state.

4 Claims, 6 Drawing Sheets

VEHICLE DOOR CONTROLLING APPARATUS

CROSS-REFERENCES TO RELATED APPLICATIONS

This application is based on and claims priority under 35 U.S.C. § 119 with respect to Japanese Application No.2003-115996 filed on Apr. 21 2003, the entire contents of which are incorporated herein by reference.

BACKGROUND OF THE INVENTIONS

1. Field of the Inventions

[Technical Field of the Invention]

The present invention relates to a vehicle door controlling apparatus for controlling the opening and closing of the door installed in a vehicle using a controlling unit, and more specifically, relates to the vehicle door controlling apparatus for performing a detection of insertion when a insertion occurs by the vehicle door that is opened or closed by an opening operation or closing operation.

2. Description of the Related Art

In the conventional vehicle, it is known that an apparatus automatically opens and closes an entrance for getting on and off installed in a vehicle body by driving a door (sliding door) that quite freely opens and closes using a driving source (e.g., a motor), so that passengers can get on and off a vehicle. Such kind of related art is, for instance disclosed in the Japanese Patent Application laid-open publication No. 10(1998)-169313.

In a vehicle shown in the above related art, while a sliding door drives to be closed by a driving source, when the vehicle starts to drive from a stop state, driving of the sliding door is continuously performed, but the release of the detecting function of insertion and the criterion of determination (determination threshold value) is strict.

SUMMARY OF THE INVENTION

However, in a method shown in the aforementioned related art, even though the state of a vehicle is changed into a driving state from a stop state during closing control of a sliding door and the vehicle starts to drive while closing the sliding door, the sliding door can be securely controlled in a direction for closing. However, in this case, when the vehicle starts to move in the stop state, in order to prevent detection failure of insertion in insertion determination, a determination threshold value used to perform detection of insertion becomes smaller. Thus, the detection sensitivity of insertion is deteriorated.

The present invention is directed to overcome such a drawback. Accordingly, an object of the present invention is to provide a vehicle door controlling apparatus in which the detection sensitivity of insertion is not lowered and detection of insertion is performed accurately, even when the vehicle starts to move while the door of the vehicle is in closing operation.

According to the present invention, the apparatus comprising a driving unit which drives a door of a vehicle, a speed detecting unit which detects the speed of the door of the vehicle, and a controlling unit which controls the door of the vehicle to make the speed of the door of the vehicle a predetermined target door speed based on an output from the speed detecting unit and performs deceleration control of the doors of the vehicle just before a whole closed position, wherein the controlling unit performs a detection of insertion caused by an opening and closing operation of the door of the vehicle, and performs insertion processing when the detection of insertion is performed, wherein the apparatus further comprises a driving detecting unit which detects stoppage or driving of the vehicle, and when the vehicle is in a driving state while the door of the vehicle is controlled in a direction for closing, the apparatus increases a voltage applied to the driving unit compared to a stop state of the vehicle.

Other objects and further features of the present invention will be apparent from the following detailed description with the accompanying drawings.

DESCRIPTION OF THE PREFERRED EMBODIMENTS

Hereinafter, an embodiment of the present invention will be described in detail with reference to the accompanying drawings.

Figure 1:
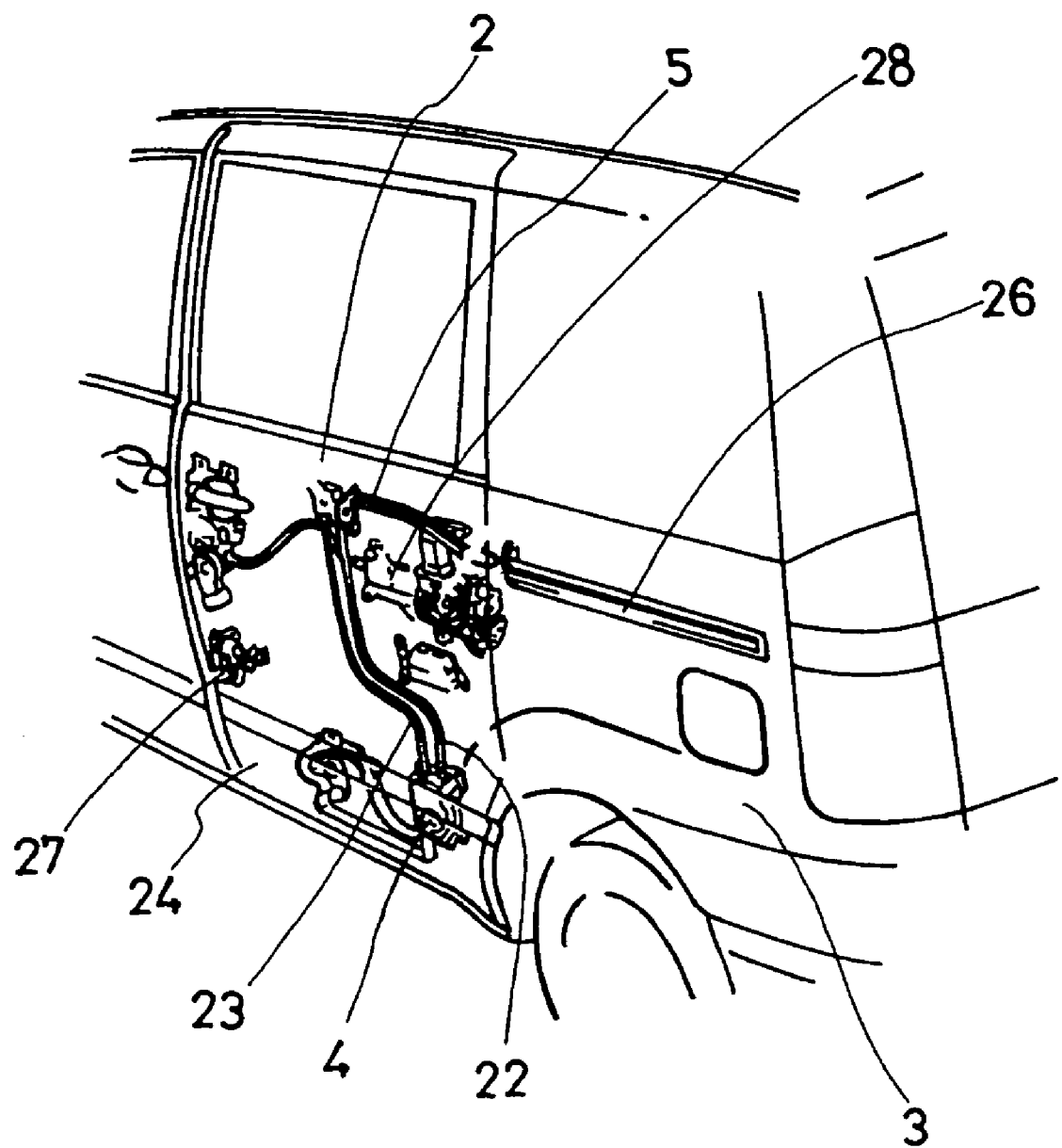
FIG. 1 is an installation view showing a configuration of vehicle door controlling apparatus according to an embodiment of the present invention.
Figure 2:
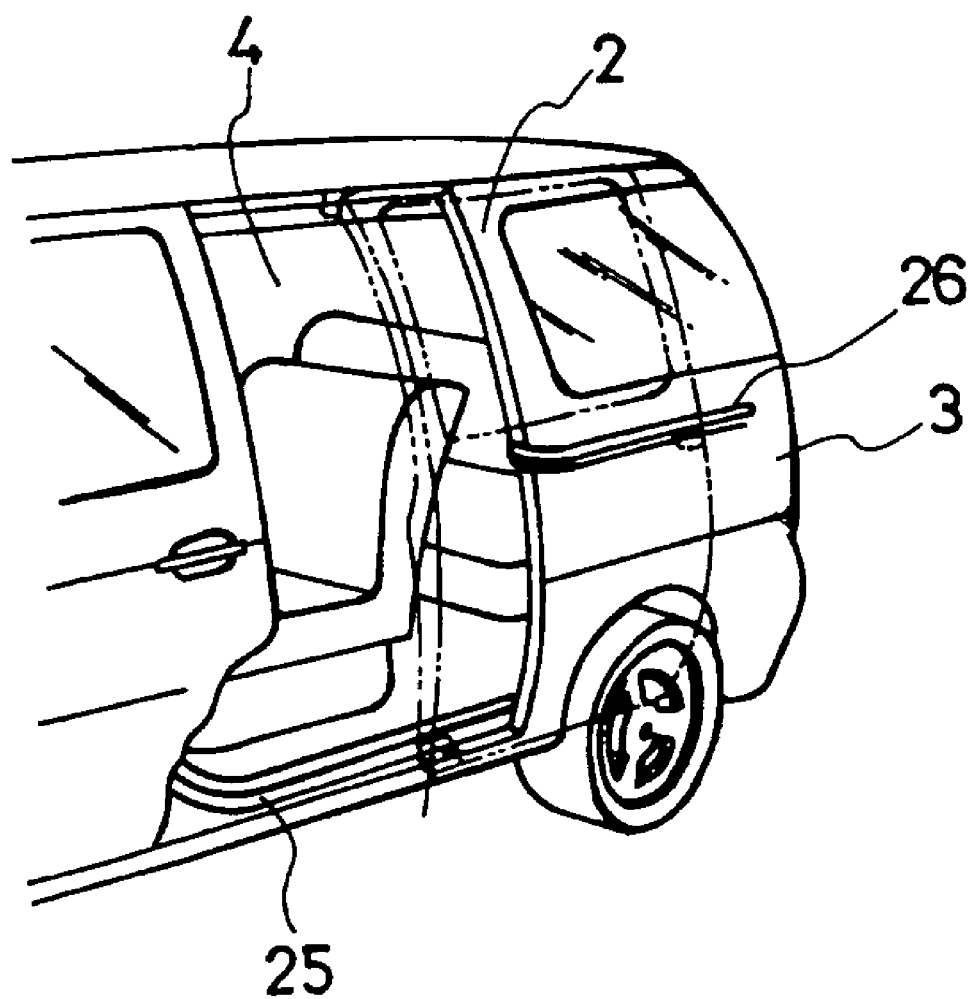
FIG. 2 explains a state where a sliding door shown in FIG. 1 is opened and closed.

FIG. 1 shows the installation of a vehicle in which a vehicle door controlling apparatus 1 is applied to a power sliding door controlling apparatus for controlling opening and closing of a door 2 (sliding door) of the vehicle by electrical operation. The vehicle shown in FIG. 1 is not limited to this, but a one box-type vehicle is exemplified. A passenger entrance 4 where passengers get on and off a vehicle is installed in the longitudinal direction of the vehicle. The passenger entrance 4 is installed to move the sliding door 2 in forward and backward directions of the vehicle quite freely. The sliding door 2 slides along a lower rail 25 installed at a vehicle body 3 in the backward direction of the passenger entrance 4 and a center rail 26 which is installed in the vehicle body 3 from the center of the passenger entrance 4 in the backward direction, and the sliding door 2 quite freely moves between a whole closed position wherein the passenger entrance 4 is completely closed and a whole opened position wherein the passenger entrance 4 is completely opened, by the driving force generated by rotation of a motor 4 (FIG. 1).

The sliding door 2 includes the motor 4 which is a driving source disposed between an outer panel 24 and an inner panel inside the outer panel 24, and a power transmission mechanism 5 which, due to the driving force generated by the motor 4, opens and closes the sliding door 2 by rotating a drum in the opening direction via an opening side cable 22 or in the closing direction via a closing side The motor 4 is assembled and includes a magnet clutch which connects or intercepts the driving force applied to the motor 4 and a drum which drives the cables 22 and 23 by rotation force. The motor 4 connects the magnet clutch to the drum to enable the sliding door 2 to perform operation electrically, and simultaneously, disconnects the magnetic clutch so that the driving force from the motor 4 to the drum is intercepted and the sliding door 2 can be operated by manual manipulation. Two Hall elements 7 (speed detection means) which detect a rotation state of the motor 4 are disposed in the motor 4.

In the above structure, when the sliding door 2 is driven from the whole closed position to the direction for opening or from the whole opened position to the direction for closing, the door is operated in cooperation with a front locking unit 27 and a closure unit 28, which are installed at the vehicle body 3, but detailed descriptions thereof will be omitted.

Figure 3:
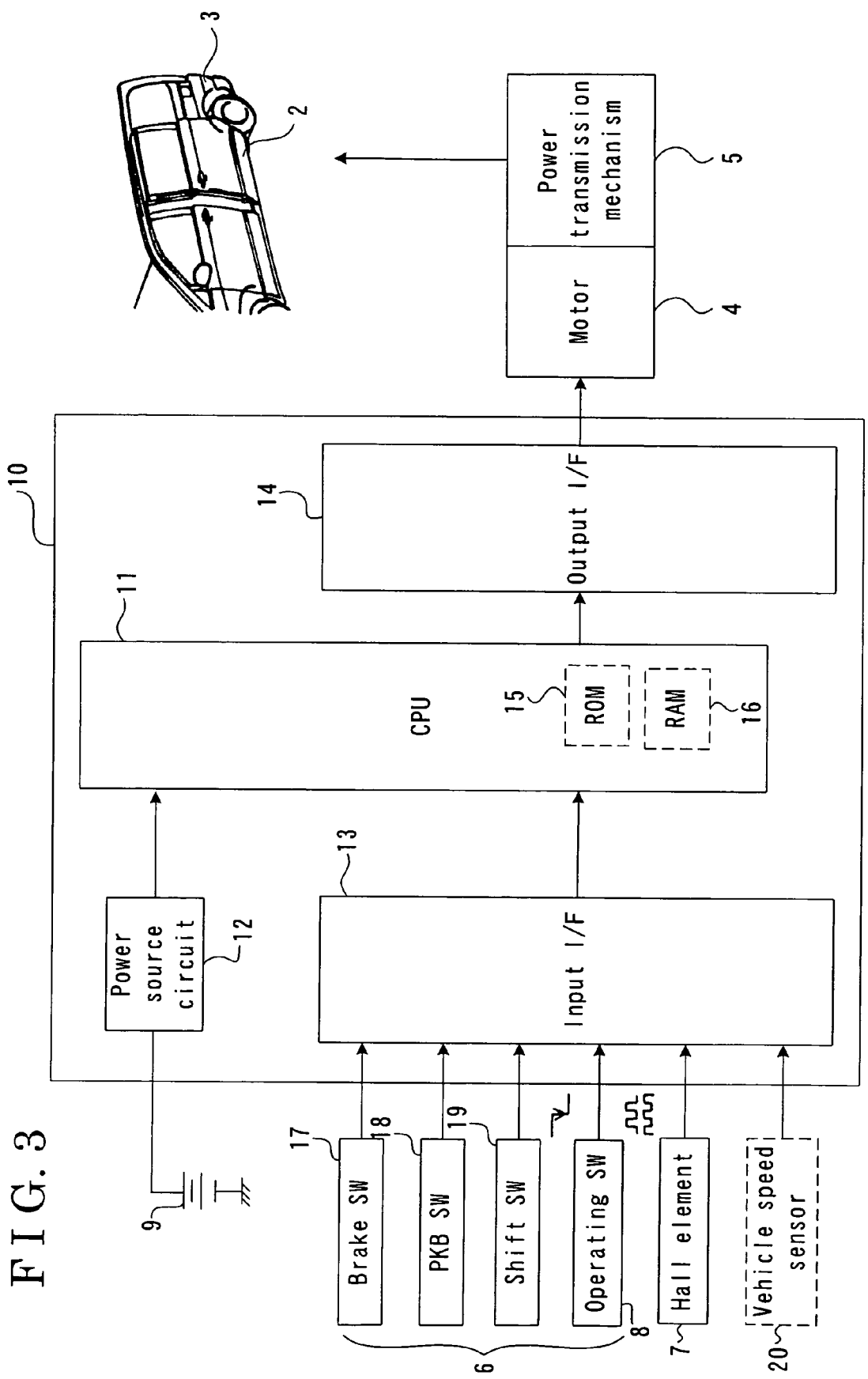
FIG. 3 is a block diagram showing an internal configuration of a controller of the vehicle door controlling apparatus and electrical connection with external parts according to an embodiment of the present invention.

The system configuration of the vehicle door controlling apparatus 1 will be described with reference to FIG. 3.

The vehicle door controlling apparatus 1 is configured so that control operation is performed by a controller 10 (controlling means) and power is supplied to the controller 10 from a battery 9. Signals outputted from a switch group 6, (for example, brake signal outputted from a brake switch 17 (drive detection means) which detects a braking operation of the vehicle, PKB signals outputted from a parking brake switch 18 (drive detection means), shift signals outputted from a shift-switch 19 (drive detection means) of a transmission, and signals outputted from an operating switch 8 which requests for opening and closing of the sliding door 2) are inputted into the controller 10, and simultaneously, signals outputted from the Hall elements 7 which detect the rotation state of the motor 4 which drives the sliding door 2 and detect the door position up to the whole opened state using the whole closed state of the sliding door 2 as a reference point (0 point), are inputted into the controller 10. The Hall elements 7 have two Hall ICs and are installed at a part of the power transmission mechanism 5 connected to the output shaft of the motor 4 or to the motor 4. The Hall elements 7 output signals having different phases so that the operation direction of the sliding door 2 can be determined from the outputted signals based on the rotation direction of the motor 4. Further, a vehicle speed signal outputted from a vehicle speed sensor 20 (drive condition detection means) that detects a driving speed of the vehicle, is Inputted into the controller 10 as necessary. In this case, a signal outputted from a wheel speed sensor installed at the wheel of the vehicle may be used as the vehicle speed signal outputted from the vehicle speed sensor 20, or the vehicle speed signal may be detected from the rotation of the output shaft of the transmission.

Meanwhile, with respect to the internal configuration of the controller 10, the controller 10 includes a power source circuit 12, an input interface 13 (input I/F), and an output interface 14 (output I/F). A voltage (for example, power supply voltage of 12 V) inputted into the controller 10 from the battery 9 is converted to a stable constant voltage (for example, 5 V) by the power source circuit 12 inside the controller 10 and is supplied to CPU 11 etc. The signals outputted from the switch group 6 or the Hall elements 7 are inputted into the CPU 11 via the input I/F 13. The CPU 11 may employ a read only memory (ROM) 15 in which a program is memorized and a random access memory (RAM) 16 in which data is temporarily memorized during operation. Since the CPU 11 drives the sliding door 2 based on the inputted signals, the CPU 11 outputs a driving signal for operating the motor 4. In this case, driving signal to the motor 4 is transmitted via the output I/F 14 (for example, driver circuit). When the motor 4 is driven by an instruction from the CPU 11 power is transmitted to the power transmission mechanism 5 connected to the output shaft of the motor 4, and the sliding door 2 is driven. In this case, when the sliding door 2 is driven between the whole closed state and the whole opened state, the sliding door 2 may be controlled in connection with the closure unit which makes the state of the sliding door 2 from a half-door state to the whole closed state and a release unit which opens and closes the sliding door 2 quite freely by permitting or forbidding the movement of the sliding door 2. However, this is not directly related to the descriptions of the present invention, and thus, detailed descriptions thereof will be omitted.

Next, the control process of the sliding door 2 performed by the CPU 11 of the controller 10 will be described with reference to a flow chart shown in FIG. 4. Hereinafter, a processing flow of a program is shown as steps, and each of the steps is shown as S.

Figure 4:
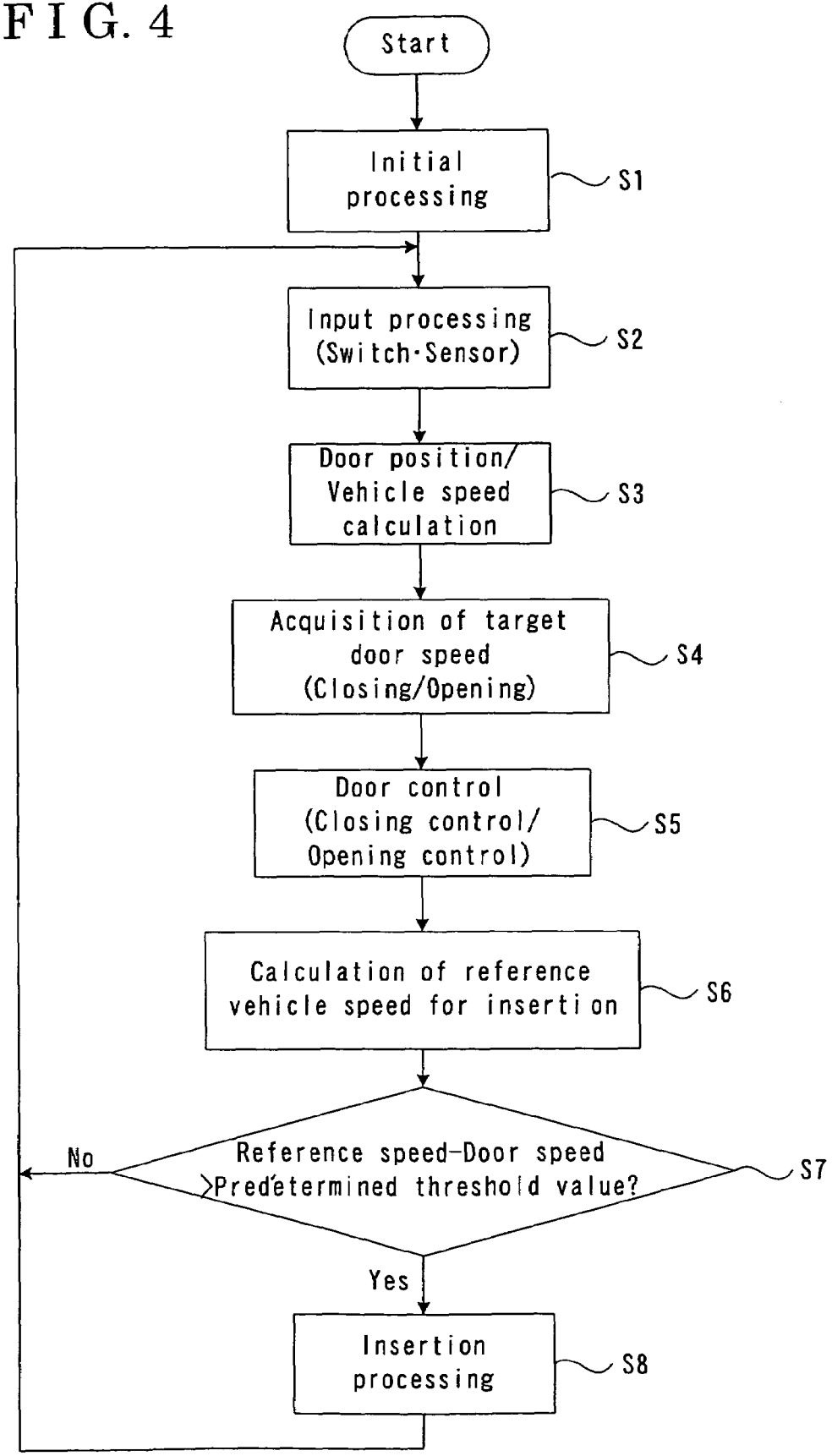
FIG. 4 is a flow chart showing door control of the sliding door having an insertion function performed by the controller shown in FIG. 3.

When power is supplied to the CPU 11 from the battery 9, processing shown in FIG. 4 is performed at every predetermined period (for example, several msec). The CPU 11 performs initial processing of step S1. In the initial processing of step S1, at first, checking the operation of the ROM 15 and the RAM 16 inside the CPU 11 is performed, and after checking is completed an initial value is inputted into the RAM 16. In this, case, it is simultaneously checked whether a system for operating the sliding door 2 operates normally or not. After the initial processing of step S1 is completed, input processing is performed in step S2. In the input processing of step S2, signals outputted from the switch group 6, such as signals outputted from the Hall elements, and vehicle speed signals outputted from the vehicle speed sensor 20, are inputted into the CPU 11 via the input I/F 13, and the input state is memorized in a predetermined memory in RAM. In step S3, an operation on the position and speed of the sliding door 2 is performed from the state inputted into the predetermined memory. In this case, the CPU 11 regards the whole closed state of the sliding door 2 as the reference point (0 point) of the door position. When the sliding door 2 moves in the direction for opening, the value of a position counter is increased, and when the sliding door 2 moves into the closed direction the value of the position counter is reduced so that the position of the sliding door 2 can be detected by the CPU 11. In addition, the speed of the sliding door 2 can be detected using a well-known method by counting the number of pulses outputted from the two Hall elements 7, and the position of the sliding door 2 can be detected depending on how many pulses are inputted into the CPU 11 within a predetermined time. In this case, since the Hall elements 7 having two different phases are used the movement direction of the sliding door 2 can be determined using the pulse pattern inputted into the CPU 11.

Figure 6:
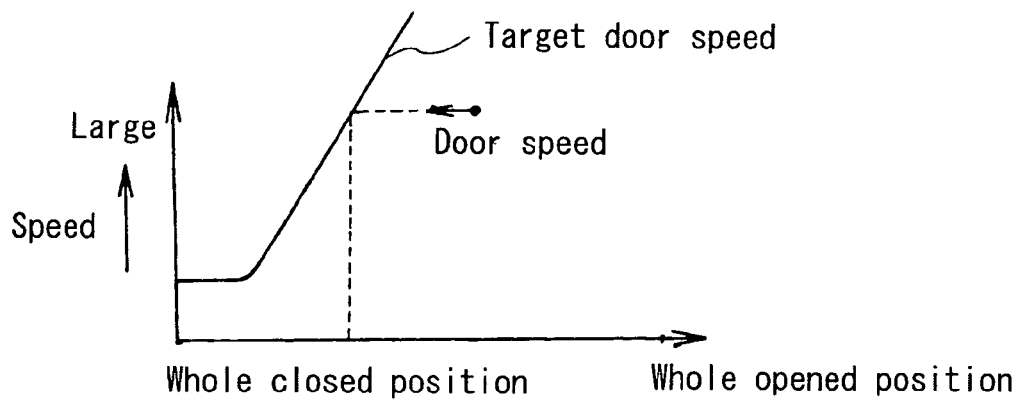
FIG. 6 is a view showing a target door speed in the opened and closed positions of the sliding door of the vehicle door controlling apparatus according to an embodiment of the present invention.

In step S4, process for obtaining the target door speed is performed. In the present embodiment, the target door speed is memorized in the RAM 16. The target door speed, which is predetermined using the operation direction (direction for closing/direction for opening) and the position of the sliding door 2 is used. For example, as shown in FIG. 6, the target door speed of the sliding door 2 in driving in the direction for closing in an area near the whole closed position (for example, an area which corresponds to several centimeters to several tens of centimeters) is set to a predetermined gradient so that even though a foreign substance is inserted into the sliding door 2 during the closing operation, load (insertion load) caused by insertion does not exceed the predetermined load, and after that, the target door speed is set to be constant to the whole closing. In step S5, if the target door speed is obtained in the feedback control between the obtained target door speed and the calculated door speed is performed so that the sliding door 2 is controlled. A door control (at the time of opening operation) will be described in detail later, If door control is performed in step S5, the CPU 11 performs detection of insertion from steps S6 to S8. In other words, in step S6, a reference speed for determining insertion is calculated. This reference speed for insertion is detected by the Hall elements 7, and the CPU 11 calculates a door speed from the output of the Hall elements 7. For example, a set of past door speeds is memorized in the RAM 16 of the CPU 11 at a predetermined number of times or predetermined period (60 msec) in time series, the door speed is filtered, and the average value of the predetermined number of times or the predetermined period of the door speed is set to be the reference speed for insertion.

In step S7, the deviation between the reference speed for entrapment calculated in step S6 and the current door speed is calculated. The deviation is compared with the predetermined entrapment determination threshold value (for example, a fixed value). Here, when the deviation does not exceed the predetermined threshold value, the CPU 11 determines that the speed of the sliding door 2 is not reduced by the insertion during the movement of the sliding door 2, the program returns to step S2, and the above-described processing is repeated from step S2. However, in step S7, when the deviation between the reference speed for entrapment and the current door speed exceeds the predetermined threshold value, the CPU 11 determines that entrapment occurs during the movement of the sliding door 2 and that the speed of the sliding door 2 is reduced by a predetermined value with respect to the filtered reference speed. Then, the program returns to step S2 after entrapment processing is performed in step S8, and the above-described processing is repeated from steps S2 to S8. For example, when the motor 4 is driven in the direction for closing and the sliding door 2 is in closing operation, the motor is stopped or rotated in reverse, and the sliding door 2 is driven by a predetermined value to the opened direction, so that entrapment when entrapment occurs, suppresses an increase in load and stability can be improved.

Next, driving of the sliding door 2, which is an essential part of the present invention, is restricted to door control in the direction for closing and will be described.

Figure 5:
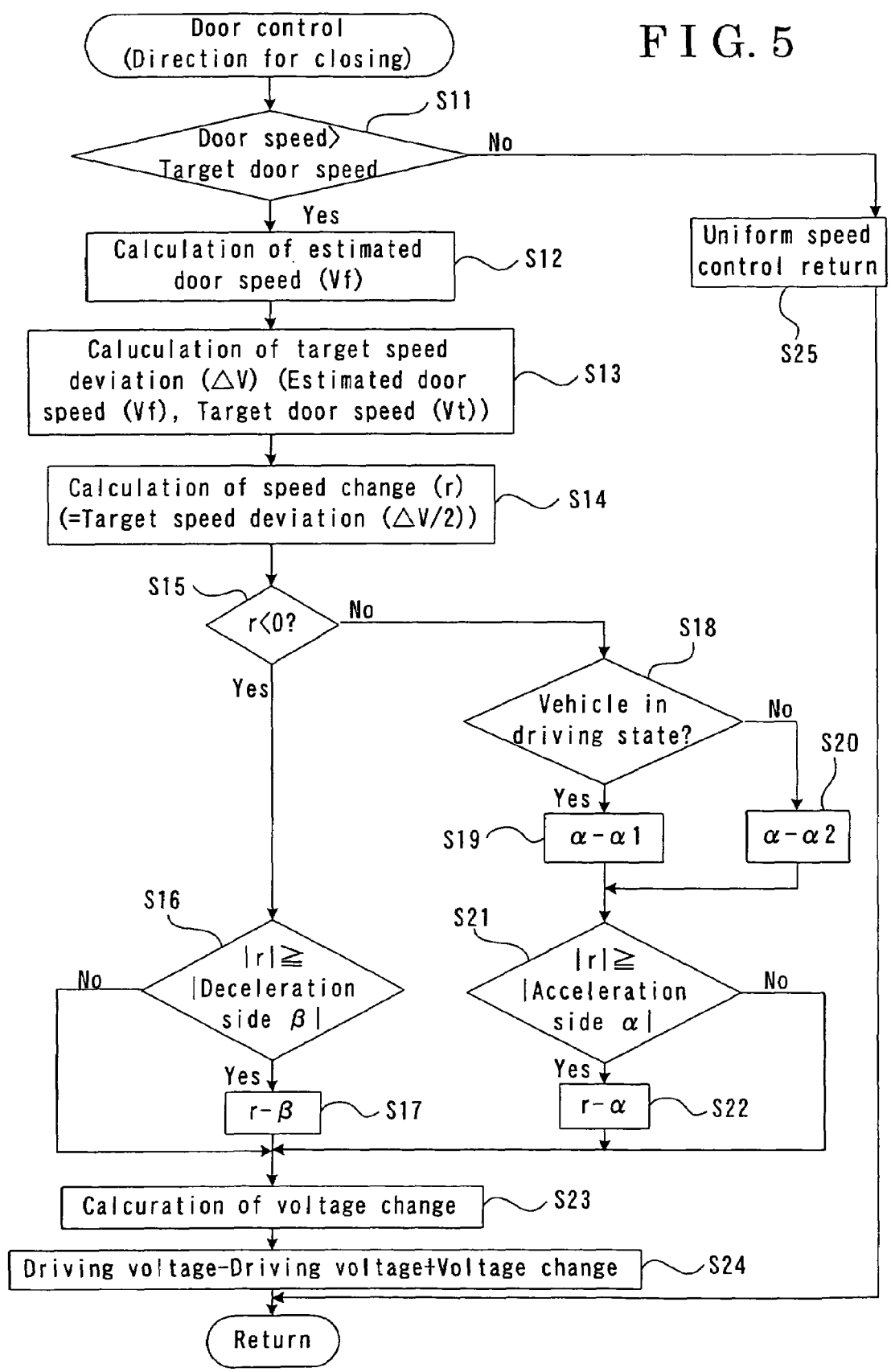
FIG. 5 is a flow chart showing control in the direction for dosing of the sliding door of door control shown in FIG. 4.

In step S11, it is determined whether the current door speed exceeds the target door speed Vt or note and when the current door speed does not exceed the target door speed Vt, uniform speed control shown in step S25 is performed, and door processing shown in FIG. 5 is terminated. In other words, in the present embodiment, as described above, the target door speed Vt in an area near the whole closed position is set to a predetermined gradient, and when the current door speed Vn does not exceed the target door speed Vt uniform speed control having a uniform closing speed is performed. However, when the current door speed Vn exceeds the target door speed Vt, deceleration control that is shown after step S12 is performed.

In step S12, an estimated door speed Vf is calculated. The estimated door speed Vf is obtained by estimating the door speed to be reached after a predetermined time (for example, 60 msec) from the past door speed Vo (for example, before a predetermined time (60 msec)) and the current door speed Vn. The estimated door speed Vf is calculated using a linear estimation method of obtaining a door speed to be reached after a predetermined time by connecting two points, that is, the current door speed Vn and the past door speed Vo, in a straight line and by extending the line. If the estimated door speed Vf is obtained in step S12, in step S13, the target speed deviation $\Delta V$ that is the speed deviation between the estimated door speed Vf and the current target door speed Vt, is obtained. If the target speed deviation $\Delta V$ is obtained in step S13, in step S14, the half value ($=\Delta V/2$) of the target speed deviation $\Delta V$ is calculated as a speed change value r which is a base for changing a driving voltage of the motor 4.

In step S15, processing is separated depending on whether the speed change r is positive or negative. If the amount of speed change r is negative, the program proceeds to step S16, and if the amount of speed change r is positive, the program proceeds to step S18.

In step S16, it is determined whether an absolute value of speed change r is greater than an absolute value of a predetermined limiter $\beta(\beta<0)$ set at a deceleration side. Here, if the absolute value of the speed change r is greater than the absolute value of the limiter $\beta$, the amount of the speed changer in step S17 is multiplied by the deceleration limiter, and the program proceeds to step S23. However, if the amount of the speed change r does not exceed the deceleration limiter at a deceleration side, the limiter restriction by the limiter at a deceleration side is not performed, and the program proceeds to step S23.

Meanwhile, in step S15, if the amount of the speed change r is positive, processing after step S19 is performed. In this case, in step S18, it is determined whether the vehicle is in a driving state or not, and the result is inputed into the CPU 11. It can be determined that the vehicle is in the driving state, by the state of at least one signal selected from the vehicle speed signal outputted from the vehicle speed sensor 20 which outputs a pulse signal, the PKB signal in which the switch state of the PKB switch 18 is changed into an off state from an on state (or from the off state to the on state) during a parking operation, and the brake signal in which the state of the brake switch is changed into the off state from the on state (or from the off state to the on state) during a brake pedal operation.

If the vehicle is in the driving state, in step S19, a predetermined value $\alpha 1$ is set in an acceleration side limiter $\alpha(\alpha>0)$. Meanwhile, if the vehicle is in the stop state, a predetermined value $\alpha 2$, which is smaller than the predetermined value $\alpha 1$, is set in the acceleration side limiter in step S20. When the acceleration side limiter is set in step 19 and step 20, in this case, the acceleration side is determined. It is determined that the absolute value of the amount of the speed change r is greater than the acceleration side limiter $\alpha$. When the absolute value of the amount of the speed change r is greater than the acceleration side limiter in step S22, the amount of the speed change r is multiplied, by the acceleration side limiter, and the program proceeds to step S23. However, if the amount of the speed change r at the acceleration side is not greater than the acceleration side limiter α, the limiter restriction by the acceleration limiter α is not performed, and the program proceeds to step S23.

In step S23, since the dimension of the amount of the speed change r in which the correction by the limiter is performed on the acceleration and deceleration sides is speed, the speed is converted into a voltage. In this conversion, the rotational speed of the motor 4 is determined by a voltage applied to the motor 4 for driving the motor 4. Thus, a line is defined as a linear function (for example, function in which speed increases proportionally to voltage) between the driving voltage for driving the motor 4 and the speed. Voltage conversion from the speed of the amount of the speed change r is performed based on the line, and the amount of a voltage change is calculated. In step S24, the amount of the voltage change obtained in step S23 is added to the current driving voltage for driving the motor 4 such that the driving voltage applied to the motor 4 is obtained and the motor 4 is driven in response to the driving voltage.

Figure 7:
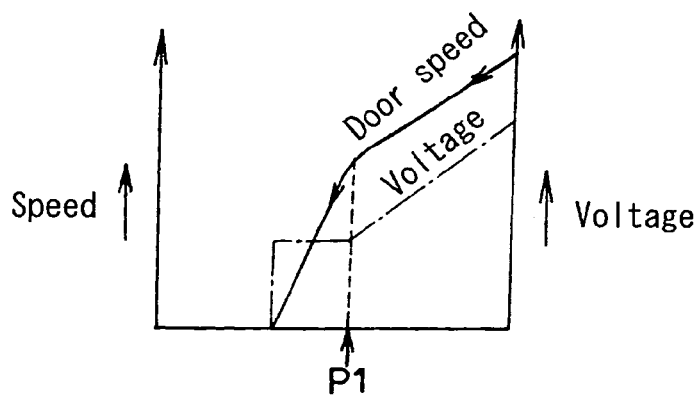
FIG. 7 explains a state where the relationship between the door speed of the sliding door and a driving voltage of a motor for operating the sliding door is shown in a stop state of the vehicle.

In other words, in the processing shown from steps S12 to S24, feedback control of the door speed in respect to the target door speed Vt is performed, thereby performing control for making the door speed coincident with the target door speed. When the vehicle is in the stop state, during a deceleration control period (a period when the target door speed decreases) shown in FIG. 6, the driving voltage of the motor 4 is gradually reduced when the sliding door 2 is driven up to the whole closed position. In this procedure, when insertion occurs at a point P1, the door speed Vn is gradually reduced from the insertion occurrence point P1. Thus, when the door speed Vn is reduced to a predetermined threshold value by more than a reference speed for insertion, insertion can be detected. However, in this case, the driving voltage of the motor 4 is set to be constant, as shown in FIG. 7, and the driving voltage is not increased. Thus, insertion load caused by the movement of the sliding door 2 is not increased over a predetermined load when insertion occurs.

Figure 8:
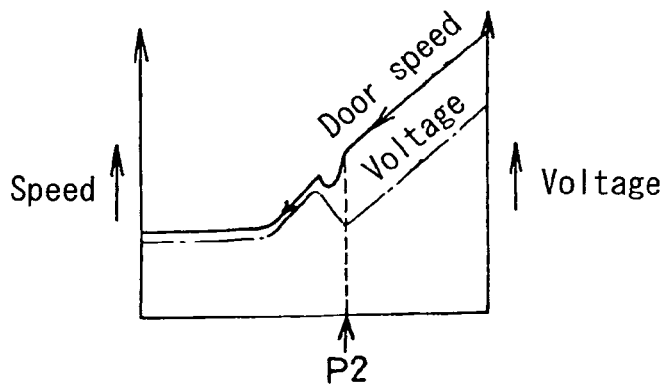
FIG. 8 explains a state where the relationship between the door speed of the sliding door and a driving voltage of a motor for driving the sliding door is shown in a driving state of the vehicle.

Meanwhile, FIG. 8 illustrates a case where the vehicle is in the driving state in FIG. 8, while the sliding door 2 is controlled in the direction for closing, in a deceleration control area just before the whole closed state, when the vehicle starts to move and the inertia force at the time of start to move acts as the inertia force in the sliding door 2 at point P2, the door speed Vn becomes instantaneously smaller than the target door speed Vt. However, in this case, the driving force applied to the driving motor 4 is increased compared to the stop state. As such, even though the door speed Vn is reduced instantaneously, the door speed Vn instantaneously approaches the target door speed Vt, and the door speed Vn from the reference speed for insertion determination exceeds a predetermined value, and a failure at detection for insertion due to the inertia force can be prevented.

According to the present invention, when the state of a vehicle is changed into a driving state from a stop state, even when an inertia force generated by performing the driving state acts on a door of a vehicle, the door of the vehicle that moves in the direction for closing is prevented from moving in the direction for opening by the inertia-force, and detection failure of insertion can be prevented. As such, a driving force applied to a motor is increased in the driving state of vehicle compared to the stop state of the vehicle, the movement to the direction for opening of the vehicle door caused by the inertia force is prevented, and the sliding door can be securely driven in the direction for closing. In addition, since an insertion determination threshold value is not changed, the sensitivity of insertion detection is not deteriorated.

What is claimed is:

1. A vehicle door controlling apparatus, the apparatus comprising a driving means which drives a door of a vehicle, a speed detecting means which detects the speed of the door of the vehicle, and a controlling means which controls the door of the vehicle to make the speed of the door of the vehicle approach a predetermined target door speed based on an output from the speed detecting means and performs deceleration control of the door of the vehicle just before a whole closed position, wherein the controlling means detects an entrapment of an object caused by an opening and closing operation of the door of the vehicle, and stops driving the door or drives the door toward a whole open position when the entrapment is detected, wherein the apparatus further comprises a driving detecting means which detects a stop state or a driving state of the vehicle, and when the vehicle is in the driving state while the door of the vehicle is controlled in a direction for closing, the apparatus increases a voltage applied to the driving means compared to the stop state of the vehicle.

2. The vehicle door controlling apparatus according to claim 1, wherein said controlling means memorizes a current door speed and a past door speed, and calculates an estimated door speed which is a door speed after a predetermined amount of time by performing door speed estimation from both the current door speed and the past door speed, and calculates a voltage increase or decrease amount of the voltage applied to the driving means based on a deviation between the estimated door speed and the target door speed, and controls a voltage to be applied to the driving means based on the voltage increase or decrease amount.

3. The vehicle door controlling apparatus according to claim 1, wherein the driving means comprises a motor.

4. The vehicle door controlling apparatus according to claim 2, wherein the driving means comprises a motor.

* * * * *